Nov. 14, 1944.     S. E. HEYMANN     2,362,552
SCOOP FOR AIRCRAFT
Filed April 2, 1943     2 Sheets-Sheet 1

Inventor:
Seymour E. Heymann
By Williams, Bradbury & Hinkle
Attorneys

Nov. 14, 1944.          S. E. HEYMANN           2,362,552
                        SCOOP FOR AIRCRAFT
                    Filed April 2, 1943       2 Sheets-Sheet 2
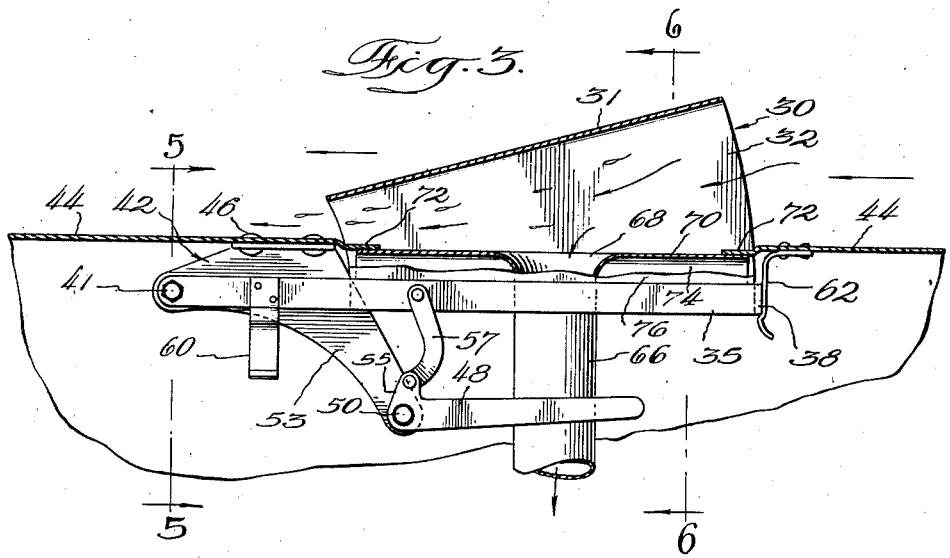
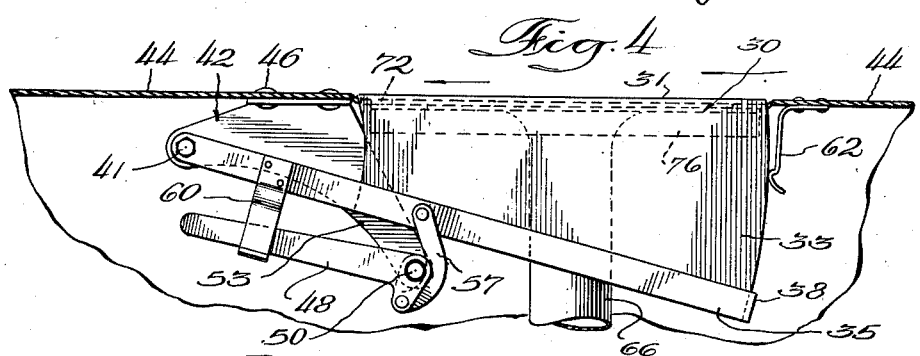
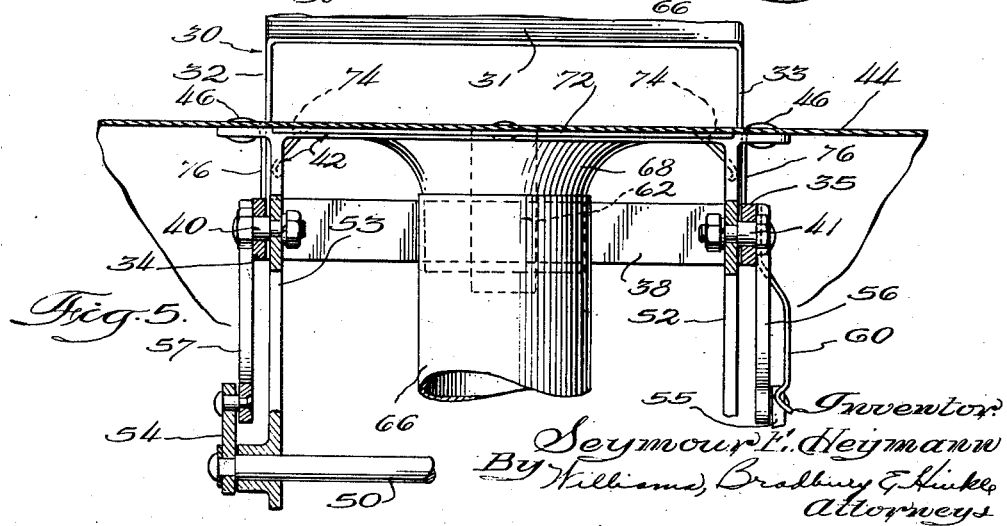
Inventor
Seymour E. Heymann
By Williams, Bradbury & Hinkle
Attorneys Patented Nov. 14, 1944

2,362,552

UNITED STATES PATENT OFFICE 2,362,552

SCOOP FOR AIRCRAFT

Seymour E. Heymann, Chicago, Ill., assignor to Stewart-Warner Corporation, Chicago, Ill., a corporation of Virginia Application April 2, 1943, Serial No. 481,553

1 Claim. (Cl. 98—1)

My invention relates generally to scoops for aircraft by which the atmospheric air is admitted to the cabin or other space within the aircraft, and more particularly to an air scoop of this type which is constructed to prevent raindrops or the like from being drawn into the airplane.

Aircraft are usually equipped with rams or scoops to admit atmospheric air to the cabin or other space in the aircraft, such, for example, as supplying air to the engine carburetors, supplying ventilating air to the cabin, and supplying air for the operation of heaters. In most of these uses of scoops on airplanes, it is desirable that the air withdrawn from the atmosphere be as free from raindrops as possible, and it is thus an object of my invention to provide an improved air scoop in which substantially all rain is removed from the air before it is drawn into the space to be supplied.

A further object of my invention is to provide an improved air scoop in which a portion of the air and any particles of water or other matter heavier than air pass directly through the scoop, while only air which is substantially free from particles of water, ice, etc., flows into the space to be supplied with fresh air.

A further object of the invention is to provide an improved air scoop having a means for preventing raindrops from passing into the space to be supplied with air.

A further object is to provide a scoop of the above described type which is retractible so as to offer a minimum of drag when the scoop is not in use.

Other objects will appear from the following description, reference being had to the accompanying drawings, in which:

Fig. 3 is a longitudinal sectional view of a modified form of my invention, in which the scoop is retractible, the scoop being shown in operating position;

Figure 6:
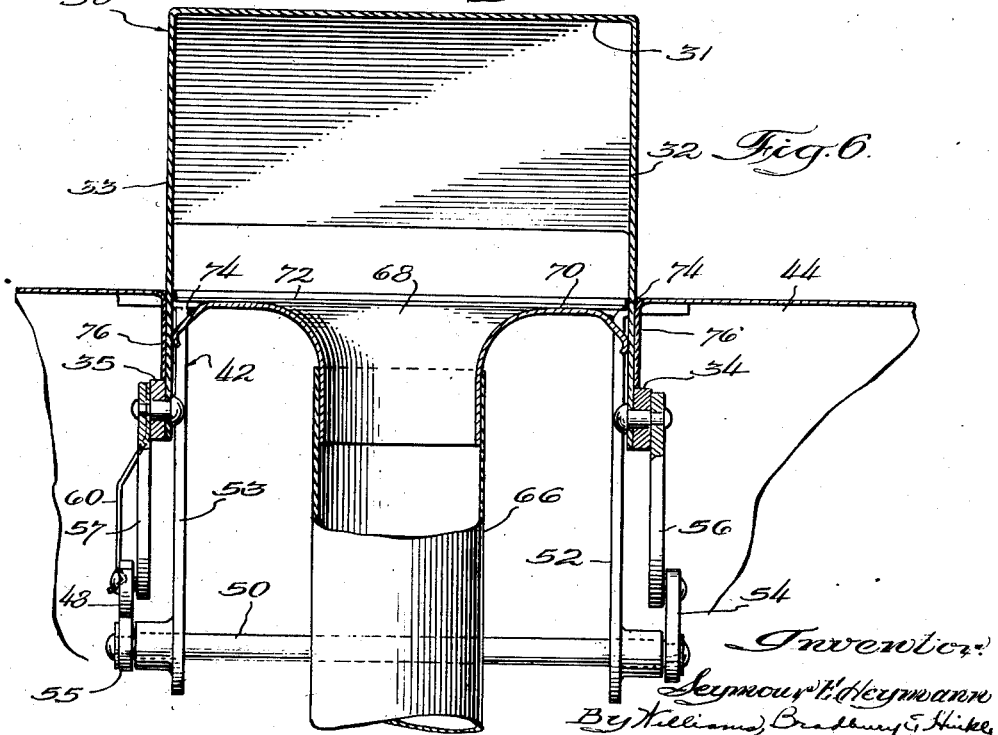

Fig. 4 is a view similar to Fig. 3 showing the scoop in closed or inoperative position; and Figs. 5 and 6 are transverse sectional views taken on the lines 5—5 and 6—6, respectively, of Fig. 3.

It is usually desirable that the air withdrawn from the atmosphere into an airplane be free from raindrops and particles of ice or sleet, and various expedients have been proposed to eliminate the rain, etc., from the air. In such expedients as have been proposed, it has been suggested that the scoop be provided with an elbow of U-turn passageway for the entering air, and that moisture collecting due to centrifugal force, upon the outer surface, be led to a suitable drain for discharge to the atmosphere. Such scoops are, however, relatively complicated in construction, and necessarily impose a greater drag than necessary.

In accordance with the principles of my invention, the scoop is constructed so as to provide a maximum air flow from the atmosphere into the space to be supplied with fresh air and to eliminate the rain prior to its passage through the skin of the airplane. Thus, in Fig. 1, the scoop is illustrated as comprising a sheet metal member 10 having an inlet opening 12 of streamlined conformation, and may be secured to the skin 16 of the airplane by marginal flanges 18 by the use of rivets or by welding. A conduit 20 for conducting the air from the atmosphere to the space to be supplied is secured to the skin 16 adjacent an opening 22 formed therein. The area of the inlet opening 12 of the scoop is preferably somewhat greater than that of the opening 22, while the rain outlet opening 14 is relatively small. The aggregate of the areas of the openings 14 and 22 will usually be somewhat less than the area of the inlet opening 12.

Figure 1:
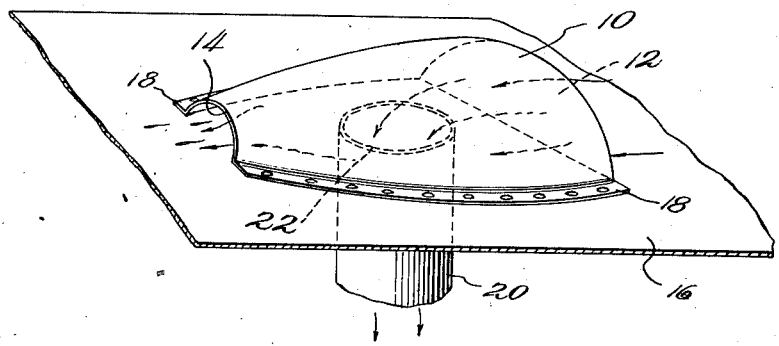
Fig. 1 is a perspective view of a portion of the skin of an airplane showing the improved scoop applied thereto.
Figure 2:
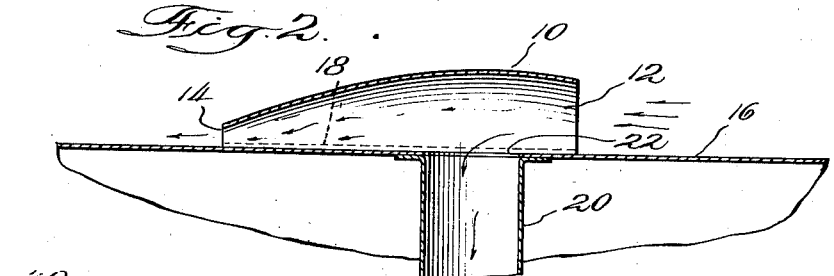
Fig. 2 is a sectional view of the scoop shown in Fig. 1.

When the airplane is traveling to the right (Figs. 1 and 2), the air flow relative to the airplane will be in the direction of the arrows in Figs. 1 and 2. Most of the air entering the inlet opening 12 of the scoop, will have its dynamic pressure head converted to static pressure head and will flow at a lower speed through the opening 22 into the conduit 20. Any particles of rain, sleet, or the like, will, due to their greater momentum, be carried past the opening 22 and will be carried outwardly to the atmosphere with a substantial stream of air through the outlet opening 14. It will be noted that the opening 14 is relatively large and that thus a substantial proportion of the air entering the scoop will escape through this port and carry with it droplets of rain, sleet, and the like. It will be noted that the restriction of the cross-sectional area within the scoop member takes place to the left of the opening 22 and thus the raindrops continue to travel past the opening 22 at high velocity and are not conveyed into the duct 20 by the air flowing into this duct, but instead, continue toward the outlet opening 14.

In the modified form of the invention shown in Figs. 3 to 6, the scoop is of the retractible type, and comprises a member 30 having an outer wall 31 and side walls 32 and 33. A pair of bars 34, 35 is rigidly secured to the inner edges of the walls 32 and 33, these bars being secured to or formed integrally with a cross piece 38, and being pivoted by means of shoulder bolts 40, 41, to a supporting bracket 42, which is rigidly secured to the skin 44 of the airplane, as by rivets 46.

An operating lever 48 is rigidly secured to an operating shaft 50 pivoted in depending arms 52, 53 of the bracket 42. Rigidly secured to the ends of the shaft 50 are two arms 54, 55, which are connected by links 56, 57 to the bars 34, 35. The links 56, 57 are curved so that when the handle 48 is swung to the position shown in Fig. 4, the inner ends of these links pass dead center position and thus automatically lock the scoop in closed position. A spring catch 60 may, however, be attached to the bar 35 for engagement with the operating lever 48 to hold the latter against rattling. Similarly, a spring catch 62 may be secured to the skin 44 in position to resiliently and frictionally engage the cross bar 38 when the scoop is in open position, as shown in Fig. 3.

An air supply conduit 66 terminates in an opening 68 formed in a conduit end plate 70, which is rigidly secured at its ends to depressed flanges 72 of the skin 44. The lateral edges of the end plate 70 are bent inwardly, as shown in Fig. 6, to form resilient edge flanges 74 which resiliently and frictionally engage the inner surfaces of the scoop side walls 32, 33 to provide a substantially air-tight seal therewith and to press the side walls 32 and 33 against inwardly turned flanges 76, and thereby firmly to support the side walls of the scoop.

By operating lever 48 from the position in which it is shown in Fig. 3 to the position in which it is shown in Fig. 4, the scoop 30 is drawn inwardly so that its outer wall 31 lies substantially flush with the skin 44, in which position it is locked by the toggle effect of the links 56, 57 and arms 54, 55. The scoop of Figs. 3 to 8 operates in the same manner as that shown in Figs. 1 to 2 in so far as the separation of rain and other foreign particles from the air is concerned. Due to the substantial difference in the sizes of the air inlet and outlet openings of the scoop 30, an appreciable pressure will be produced at the inlet 68 of the conduit 66, but raindrops and other foreign particles will, due to their greater energy of momentum, not be deflected to the conduit 66, but will continue flowing through the scoop with a substantial stream of air.

While I have shown and described particular embodiments of my invention, it will be apparent to those skilled in the art that numerous variations and modifications may be made therein without departing from the underlying principles of the invention. I therefore desire, by the following claim, to include within the scope of my invention all such modifications and variations by which substantially the results of my invention may be obtained by the use of substantially the same or equivalent means.

I claim:

A retractible air scoop comprising a scoop having parallel side walls and an outer wall, said outer wall conforming in contour to the skin of the aircraft, a pivotal supporting means for said scoop comprising a pivot spaced from one end of the scoop so that when said scoop is swung outwardly it will present a large air inlet opening and a substantially smaller outlet opening, means providing in the airplane skin an air supply opening beneath such scoop and a pair of slots receiving the side walls of the scoop.

SEYMOUR E. HEYMANN.